2,770,618

TOMATIDINE DERIVATIVES

Richard Kuhn and Irmentraut Löw, Heidelberg, Germany, assignors, by mesne assignments, to American Home Products Corporation, New York, N. Y., a corporation of Delaware No Drawing. Application October 7, 1952, Serial No. 313,593

2 Claims. (Cl. 260—239.5)

This invention relates to derivatives of the steroid secondary amine, tomatidine. More particularly, it relates to the new chemical compound, diacetyl-pseudotomatidine, and to the process by which it may be prepared from readily-available starting materials.

The secondary amine, tomatidine, is secured by cleavage of the glycosidal alkaloid, tomatine, the latter being readily obtained in crystalline form from tomato plants (Fontaine et al., J. A. C. S., vol. 73, page 878 (1951)).

When tomatidine is reacted with an acetylating agent, such as acetic anhydride in pyridine, or ketene in benzene, the reaction being preferably carried out at room temperature, the product diacetyltomatidine results. It has the empiric formula $C_{31}H_{49}O_4N$, melts at approximately 194° C., and does not contain an active hydrogen atom. It is further characterized as being convertible to 3-acetyl-tigogenine lactone, $C_{24}H_{36}O_4$, melting at 212–214° C., by oxidation with chromic acid anhydride in acetic acid: (Tschesche and Hagedorn, Ber., vol. 68, page 1412 (1935)).

It is diacetyltomatidine, $C_{31}H_{49}O_4N$, melting at approximately 194° C., that we use as the starting material in our process to produce the new chemical compound, diacetyl-pseudotomatidine.

By treatment of diacetyltomatidine by prolonged heating with a carboxylic acid, such as glacial acetic acid, or by irradiation, either by means of a strong incandescent lamp, the light from a lamp yielding ultraviolet irradiation, or by direct sunlight, the new chemical compound diacetyl-pseudotomatidine is secured. The transformation to the pseudo derivative occurs on standing in glacial acetic acid for several hours, upon boiling the diacetyl-tomatidine for several hours, or in the presence of actinic irradiation (sunlight or ultraviolet light).

The new compound, diacetyl-pseudotomatidine, of empiric formula $C_{31}H_{49}O_4N$, is a colorless amorphous compound, which melts at 90–92° C. and boils at 270–280° C. (at 0.001 millimeter of mercury pressure). It contains an active hydrogen atom and yields one mole of acetic acid in an acetyl determination. After adsorption on standard Brockmann alumina (inactivated by methanol), it may be eluted therefrom by a benzene-methanol mixture containing substantially nine parts of benzene to one part of methanol by volume. The starting material, diacetyltomatidine, on the other hand, is washed through a standard Brockmann alumina column (inactivated with methanol) with benzene, or with a benzene-ether mixture containing substantially three volumes of benzene to one volume of ether by volume.

We have found that the transformation of diacetyl-tomatidine to diacetyl-pseudotomatidine is promoted by the action of light and heat. It is complete after several hours' illumination with sunlight, with a standard 300 watt incandescent bulb, with a lamp giving ultraviolet radiation, or if the diacetyltomatidine is boiled under a reflux condenser for approximately five hours.

Diacetyl-pseudotomatidine is capable of conversion to valuable steroid products by oxidation. In our copending patent application Ser. No. 313,594, filed October 7, 1952, we have described a procedure whereby diacetyl-pseudotomatidine may be converted to 3-acyloxy-$\Delta^{16}$-allopregnen-20-ones by oxidation with hydrogen peroxide, chromic acid anhydride, and other oxidizing agents.

The pseudo compound, which is an isomer with opened rings, has the same empiric formula as diacetyltomatidine. It is stereoisometrical at the spirane carbon atom with the starting material.

As illustrative of the process for preparing the new compound, the following example is given:

Example

Diacetyltomatidine in the amount of 3 parts by weight was boiled under a reflux condenser with 100 parts by volume of pure glacial acetic acid for five hours. Two other samples of diacetyltomatidine in glacial acetic acid were irradiated at room temperature for six hours with the light from a 300 watt incandescent lamp; and subjected, at room temperature, to the action of direct sunlight for six hours.

The resulting product in glacial acetic acid, regardless of the mode of preparation, was evaporated to dryness in a vacuum to drive off the acid. The residue was then taken up in ether, and the ethereal solution evaporated. The half-solid, syrupy raw product was chromatographed in benzene on $Al_2O_3$ (prepared as described by Brockmann, inactivated with methanol). By elution with a mixture of benzene and methanol (9 parts by volume of benzene to 1 part by volume of methanol), pure diacetyl-pseudotomatidine was secured as a colorless amorphous compound melting at 90–92° C. Its boiling point was 270–280° C. (at 0.001 millimeters of mercury pressure). The yield was 90%.

Changes and modifications may be made in our procedure, a preferred embodiment of which is described herein, without departing from the spirit of our invention.

We claim:

1. The product resulting by prolonged heating, with glacial acetic acid, of diacetyltomatidine of melting point approximately 194° C., said diacetyl-pseudotomatidine product constituting an amorphous, colorless compound of empiric formula $C_{31}H_{49}O_4N$, melting at 90–92° C., and boiling at 270–280° C. at a reduced pressure of 0.001 millimeter of mercury.

2. The process of preparing diacetyl-pseudotomatidine which comprises subjecting diacetyltomatidine to the action of boiling glacial acetic acid for about five hours.

References Cited in the file of this patent

UNITED STATES PATENTS

| | | |
|---|---|---|
| 2,248,284 | Reichstein | July 8, 1941 |
| 2,562,194 | Julian | July 31, 1951 |
| 2,600,054 | Hachmann | June 10, 1952 |
| 2,633,451 | Schaltegger | Mar. 31, 1953 |
| 2,684,365 | Mosettig | July 20, 1954 |

OTHER REFERENCES

J. Amer. Chem. Soc., vol. 73, pp. 878–80, February 1951.